S. R. SCHARF.
SURFACE-COURSES FOR CONCRETE-PAVEMENTS.
No. 176,697. Patented April 25, 1876.
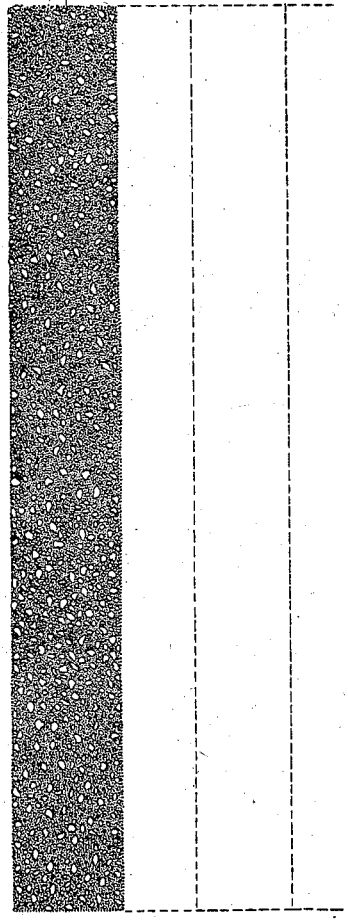

UNITED STATES PATENT OFFICE.

SAMUEL R. SCHARF, OF WASHINGTON, DISTRICT OF COLUMBIA.

IMPROVEMENT IN SURFACE-COURSES FOR CONCRETE PAVEMENTS.

Specification forming part of Letters Patent No. 176,697, dated April 25, 1876; application filed March 23, 1876.

*To all whom it may concern:*

Be it known that I, SAMUEL R. SCHARF, of Washington, in the county of Washington and District of Columbia, have invented a new and Improved Surface-Course for Concrete Pavements; and I do hereby declare that the following is a full and exact description of the same, reference being had to the accompanying drawings, and to the letters of reference marked thereon.

The object of my improvement is a surface or upper course for a concrete pavement for streets and other purposes, and the novelty therein consists in the peculiar material employed, and in the manner of compounding the same, all as more fully hereinafter explained.

In order to enable those skilled in the art to make and use my improvement I proceed to describe the same, having reference to the drawing, which exhibits a vertical section of my invention.

This surface or upper course, A, is made as follows:

I take of Trinidad asphalt, or its equivalent in natural asphalt, from seventy to ninety parts, by bulk, and of heavy paraffine-oil from ten to thirty parts, by bulk. I heat the asphalt in a suitable vessel until it reaches its boiling-point, and then stir in the oil, and permit the mixture to reach its boiling-point.

I take of stone-dust—hard limestone being the best, which stone-dust should contain no particle over three-sixteenths of an inch in diameter—and of clean, sharp sand, in the proportion of one-half to two-thirds of the stone-dust to one-third to one-half of the sand, and dry and heat them together in proper vessels; and when this mass is thoroughly heated to a point as high as the boiling-point of the asphalt and oil compound, I mix with it, thoroughly and completely, the boiling compound before spoken of, in the proportion of from forty to sixty gallons of the asphalt and oil compound to the cubic yard of the stone-dust and sand.

This compound of stone-dust, sand, asphalt, and oil, thus prepared, is taken hot to the street and poured upon the concrete pavement prepared for its reception to the depth of about two inches, when it is rolled, raked, and graded off evenly; then lightly rolled with a wet roller; then dusted upon its surface with hydraulic cement or its equivalent, and then heavily rolled until it is nearly or quite cold.

The reasons why the relative proportions of asphalt and of oil are stated with the margin of difference is because the oil tends to soften the asphalt, and, therefore, in Canada the greatest proportion of oil would be required, and at New Orleans the least proportion of oil. The reason of the margin of difference in the proportions of stone-dust and of sand is that, when there is a great proportion of fine dust in the stone-dust, more sand is required, and vice versa.

This surface or upper course, thus prepared, will be found to have great capacity for wear, and little liability to crack in cold weather, or become too soft in very warm weather. The oil will not evaporate nor the pavement become friable.

I am aware of the patent to A. B. Vandemark, of 1871, and disclaim any invention described therein, as Vandemark does not employ asphalt and paraffine in the same proportions, or subject to the same heat, that I do. Vandemark also uses finely-pulverized calcareous stone, while I use certain proportions of finely-crushed stone and of sand. The result is that, while his pavement is a very smooth and homogeneous one, unfit for use in frosty or wet weather, my pavement has always a certain roughness upon the surface, essential in use.

Having thus described my improvement, what I claim as new therein, and my own invention, is—

1. In paving compositions, a compound of asphalt and paraffine-oil, prepared substantially in the manner and in the proportions as set forth.

2. The surface or upper course for concrete pavements, consisting of stone-dust, sand, asphalt, and paraffine-oil, substantially as described.

This specification signed and witnessed this 22d day of March, 1876.

SAMUEL R. SCHARF.

Witnesses:
WILLIAM M. ASHLEY,
CHARLES THURMAN.